3,115,709
Patented Dec. 31, 1963

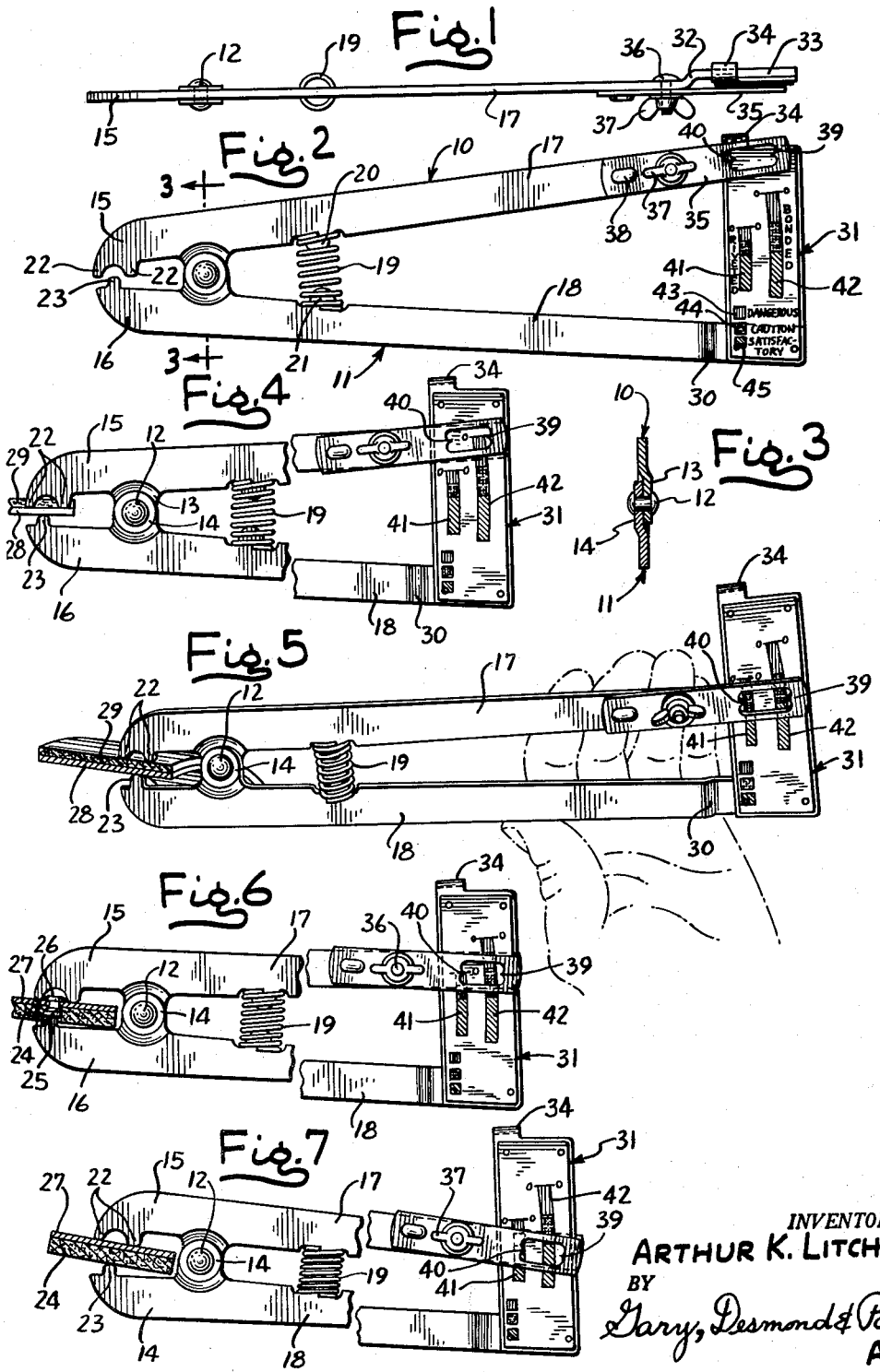
Dec. 31, 1963    A. K. LITCHFIELD    3,115,709
GAUGE
Filed March 2, 1961
INVENTOR.
ARTHUR K. LITCHFIELD
BY
Gary, Desmond & Parker
ATTYS.

1

3,115,709
GAUGE
Arthur K. Litchfield, Stratford, Conn., assignor to Raybestos-Manhattan, Inc., Passaic, N.J., a corporation of New Jersey
Filed Mar. 2, 1961, Ser. No. 92,973
1 Claim. (Cl. 33—149)

This invention relates to a novel gauge, and more particularly to a means for calibrating the usable thickness of a brake lining while mounted on a brake shoe rim, with the object in view of accurately determining and showing how much usable brake lining a motorist has on his car brakes.

The invention is particularly concerned with a novel hand-portable gauge to optionally determine the thickness of a bonded brake shoe lining while mounted on the rim of a brake shoe or effective thickness of a lining riveted thereto. It will be understood that as hereinafter employed the term "usable lining thickness" refers to either one of the foregoing, and th term "effective shoe rim thickness" will be understood to apply either to the thickness of a brake shoe rim when a bonded lining is employed, or to the thickness of a brake shoe rim plus the rivet head projecting thereover and within the brake shoe lining when a riveted lining is employed.

It is a further object of the present invention to provide novel gauge means comprising a pair of levers pivoted to provide jaw portions and a pair of relatively longer handle portions, whereby calibration of a brake shoe rim or a brake shoe rim plus a brake shoe lining is magnified and more clearly read on the gauge arm or bracket attached to the outer extremity of one of the longer handle portions, by pointer means on the other handle.

It is a further object of the present invention to provide a gauge of the class above described which is adjustable for varying thicknesses or effective thicknesses of the brake shoe rim in a manner whereby the usable thickness of a brake shoe lining mounted thereon may be readily gauged or calibrated as the difference between the total effective shoe rim thickness and the over-all thickness of the brake shoe lining and the brake shoe rim.

It is a further object of the present invention to provide novel gauge means wherein the thickness of the brake lining remaining on the brake shoe may be read in indicia categories such as: (a) dangerously thin; (b) caution—brake lining is born but not to the danger point; and (c) brake lining thickness is satisfactory.

A further object of the present invention is to provide a novel gauge for calibrating the usable thickness of a brake lining mounted on a brake shoe rim which can be readily employed either on or off the automobile in which the brake shoe is mounted.

Other objects and advantages of the present invention, its details of construction, arrangement of parts, and economies will be apparent by consideration of the following specification and accompanying drawings, wherein:

FIG. 1 is a side edge view of the gauge of the present invention.

FIG. 2 is a plan view thereof.

FIG. 3 is a section on the line 3—3 of FIG. 2.

FIG. 4 is a fragmentary similar plan view as that of FIG. 2 but showing the gauge in operative position calibrating the thickness of a brake shoe rim wherein the lining is bonded thereto.

FIG. 5 is a view similar to that of FIGS. 2 and 4 in a succeeding step of the operation showing the calibration of the usable lining of the brake shoe rim.

FIGS. 6 and 7 are similar to FIGS. 4 and 5 respectively, showing the employment of the gauge in connection with the riveted type of lining.

2

Referring to the drawings, the gauge of the present invention comprises a pair of levers generally indicated as 10 and 11 connected together as by means of a pin 12 extending through the overlapping lug members 13 and 14, carried by the levers 10 and 11 respectively, and dividing them into a pair of jaw portions 15 and 16, and a pair of relatively longer handle portions 17 and 18. These handle portions 17 and 18 are normally urged apart by the spring 19 disposed between them over the retaining lugs 20 and 21. The spring 19 while tending to hold the handle portions 17 and 18 spaced from each other tends to bring the jaw portions 15 and 16 toward each other.

The jaw portion 15 comprises a pair of terminal spaced finger portions 22, 22 and the jaw portion 16 terminates in a single finger portion 23 which extends medially of the fingers 22, 22, these being especially adapted for use in engaging linings of the riveted type in the first stage of the gauging when it is desired to first measure the effective thickness of the brake shoe rim, as shown in FIG. 6. There the finger 23 is projected into a countersink hole in brake lining 24 to contact with the rivet head 25, whereas the fingers 22, 22 are spaced to extend over and clear the rolled back portion 26 of the rivet, so that when gauging the effective metal thickness of the brake shoe rim of a riveted type brake lining the first gauging step is as shown in FIG. 6, the effective thickness of the metal or brake shoe rim being from between the outer or bottom surface of the brake shoe rim 27 to the rivet head 25 disposed within the brake lining 24.

When gauging the thickness of a brake shoe rim carrying a bonded type lining, the fingers 22, 22 and 23 play no special function other than terminal points, the finger 23 lying on one side of the brake shoe rim 28 as shown in FIG. 4 and the fingers 22, 22 on an opposed surface which does not have any overlying brake shoe lining 29. In this case the effective surface of the brake shoe rim is that of the brake shoe rim per se.

The outer terminal end portion of handle 18, which is offset as at 30, has secured thereto a gauge plate 31 which extends laterally toward the handle 17. The handle 17 is also offset at its outer end as at 32 whereby the end portion 33 freely underlies the gauge plate 31 and is limited in its outward angular movement by means of the downwardly extending leg 34 on the free end of gauge plate 31.

For the purpose of assuring accuracy of gauging and to compensate for variations or differences in effective thicknesses of brake shoe rims, the handle has mounted on its outer end portion in substantially parallel relationship thereto pointer means comprising the relatively short arm 35, the arm 35 being in angularly adjustable pivotal engagement with the handle portion 17 by means of the threaded pin or bolt 36 extending through apertures in the handle 17 and arm 35, which pivotal relationship is adapted to be limited by adjustment of the wing nut 37.

Manipulation of the arm 35 with respect to the handle portion 17 may be facilitated by manual grasping of the protrusion 38 at the inner end of arm 35. The outer end of arm 35 comprises a pair of pointers 39 and 40 for association with indicia on the gauge plate 31, the inner pointer 40 being for cooperation with the lower indicia scale 41 and the outer pointer 39 being for cooperation with the indicia scale 42 on the gauge plate 31.

As will be noted, the outer scale 41 is adapted for gauging the thickness of bonded brake lining, whereas the inner gauge is adapted for measuring the thickness of a riveted brake lining, each of these two scales 41 and 42 being divided into three zones, suitably color coded to the areas 43, 44 and 45, respectively, marked "dangerous," "caution," and "satisfactory."

Thus, when one desires to determine how much usable brake lining he has in his car brakes, such as bonded lining 29 shown in FIGS. 2 and 3, the handles 17 and 18 are manually compressed against the action of spring 19 and the jaw portions 15 and 16 engaged over a brake shoe rim portion 28, as for example at one end of the brake shoe which does not have any brake lining 29 applied thereover. At that time the handles 17 and 18 are released so that the fingers 22, 22 and 23 come to rest against the opposed surfaces of the brake shoe rim 28 under the action of spring 19.

Thereupon arm 35 is manipulated by release and tightening of wing nut 37 so that the pointer 39 coincides with the zero reading on scale 42. Then handles 17 and 18 are again compressed and the jaws 15 and 16 engaged over the outer surfaces of the lining and brake shoe rim as shown in FIG. 5. Thereupon one reads the zone at which the pointer 39 comes to rest on the scale 42, as for example shown in FIG. 5 where the pointer 39 is in the center area of the scale 42 and the zone marked "caution." This is an indication that the brake lining should be rechecked in approximately one thousand miles. Had the pointer come to rest in the area adjacent the zero reading and indicated as "dangerous," this would inform the user that the brakes should be relined immediately.

If the remaining brake lining were thicker and caused greater expansion of the jaws 15 and 16 and conversely greater contraction of the handles 17 and 18, the pointer 39 would then come to rest in the area marked "satisfactory," an indication that the brakes should be rechecked in about five thousand miles.

The color coded areas 43, 44 and 45 and the corresponding colored areas in the scales 41 and 42 are, as conventionally, the color red for "dangerous," yellow for "caution," and green for "satisfactory."

It will thus be seen that the actual gauging is by difference, that is, the pointer arm 35 is initially adjusted to zero position for the effective thickness of the brake shoe rim, regardless of what this thickness may be, and the successive reading, once the arm 35 is fixed, is dependent on the added thickness of the brake lining secured to the brake shoe rim, so that with greater thicknesses of lining the angle between handle portions 17 and 18 is decreased, and with lesser thicknesses approaching the thickness of the brake shoe rim per se the angle between the handle portions 17 and 18 increases.

The same is true when one desires to measure the useful thickness of brake lining 24 which is riveted to the brake shoe rim 27 as shown in FIGS. 6 and 7. In this case, however, the lower scale 41 is employed and the pointer arm 35 initially adjusted so that its point 40 coincides with the zero reading on scale 41 at a time when, as shown in FIG. 6, the finger 23 on jaw 16 is seated on rivet head 25 and the fingers 22, 22 on jaw 15 clear the rolled portion of the rivet 26 and engage the outer surface of the brake shoe rim 27. Thereafter, as shown in FIG. 7, the handle portions 17 and 18 are compressed so as to permit the jaws 15 and 16 and their component fingers 22, 22 and 23, respectively, to embrace the rim 27 and lining 24 at a point spaced from the rivet, and reading made on indicia scale 41 in a manner previously described with respect to the readings on scale 42, to the same end.

It will thus be apparent that I provide a simple and convenient device for permitting one, including the car owner, to readily test his brakes to determine the remaining usable brake lining thereon in an accurate manner.

I claim:

A gauge for calibrating the usable thickness of riveted and bonded brake linings while mounted on a brake shoe rim by difference between the total effective shoe rim thickness and the over-all thickness of the brake lining and the brake shoe rim, comprising a pair of levers, means connecting said levers in pivotal engagement and dividing them into a pair of jaw portions and a pair of relatively longer handle portions, one of said jaw portions comprising a pair of spaced terminal finger portions and the other comprising a single terminal finger portion projecting toward and between the former finger portions for successively embracing the aforesaid material thicknesses, a gauge plate secured to and extending laterally from the outer end portion of one of said handle portions and toward and beneath the outer end portion of thet second handle portion and carrying thereon a pair of radially spaced gauge indicia scales, spring means engaged to and extending between said handle portions normally urging them apart, pointer arm means on said second handle portion including a radially spaced pair of indicators in overlying cooperation with said gauge indicia on said gauge plate comprising a substantially parallel lever single pivot means engaging said pointer to said second handle portion and means in association therewith for maintaining said pointer in frictionally secured angularly adjustable relationship thereon for initially aligning it with a zero reading on said gauge plate indicia corresponding to said effective shoe rim thickness.

References Cited in the file of this patent

UNITED STATES PATENTS

| | | |
|---|---|---|
| 1,476,904 | Malmquist | Dec. 11, 1923 |
| 3,011,262 | Allen et al. | Dec. 5, 1961 |

FOREIGN PATENTS

| | | |
|---|---|---|
| 6,620 | Great Britain | 1900 |